US007004486B1

(12) United States Patent
Farkash

(10) Patent No.: US 7,004,486 B1
(45) Date of Patent: Feb. 28, 2006

(54) RUNNING BOARD STORAGE BOX WITH GUSSET ATTACHMENT

(76) Inventor: Daniel G. Farkash, 28442 Driver Ave., Agoura Hills, CA (US) 91301

( * ) Notice: Subject to any disclaimer, the term of this patent is extended or adjusted under 35 U.S.C. 154(b) by 300 days.

(21) Appl. No.: 10/407,693

(22) Filed: Apr. 4, 2003

Related U.S. Application Data

(63) Continuation-in-part of application No. 10/081,586, filed on Feb. 25, 2002, now abandoned.

(51) Int. Cl.
B60R 3/00 (2006.01)

(52) U.S. Cl. .................. 280/164.1; 280/769; 296/37.6
(58) Field of Classification Search ............ 280/164.1, 280/163, 165, 166, 769; 296/37.1, 37.6; 224/42.32, 538, 568; 248/503, 201, 207, 248/205.1; 182/127
See application file for complete search history.

(56) References Cited

U.S. PATENT DOCUMENTS

| | | | | |
|---|---|---|---|---|
| 1,453,362 A | * | 5/1923 | Loveland | 414/462 |
| 1,473,319 A | * | 11/1923 | Sterling | 224/42.32 |
| 1,488,720 A | * | 4/1924 | Tichy et al. | 280/164.1 |
| 1,726,398 A | * | 8/1929 | Limbocker | 296/37.1 |
| 2,981,554 A | * | 4/1961 | Mulder et al. | 280/164.1 |
| 3,764,048 A | * | 10/1973 | Gore | 224/538 |
| 4,696,507 A | * | 9/1987 | Alldredge | 296/37.6 |
| 5,458,353 A | * | 10/1995 | Hanemaayer | 280/164.1 |
| 5,511,750 A | * | 4/1996 | Evenson | 248/200 |
| 5,895,064 A | * | 4/1999 | Laubach | 280/163 |
| 6,129,401 A | * | 10/2000 | Neag et al. | 296/37.6 |
| 6,520,523 B1 | * | 2/2003 | Beck | 280/164.1 |

* cited by examiner

Primary Examiner—Christopher P. Ellis
Assistant Examiner—Brian Swenson
(74) Attorney, Agent, or Firm—Jack C. Munro

(57) ABSTRACT

A running board storage box that is designed to be mounted in conjunction with a land vehicle where the running board storage box can be used as a step to facilitate entry and exit through an access door of the vehicle. A door assembly is pivotally mounted on the front edge of the storage box. The back of the storage box includes a gusset accommodation structure in the form of an attachment which is removably mounted within a slot formed within the back.

6 Claims, 2 Drawing Sheets

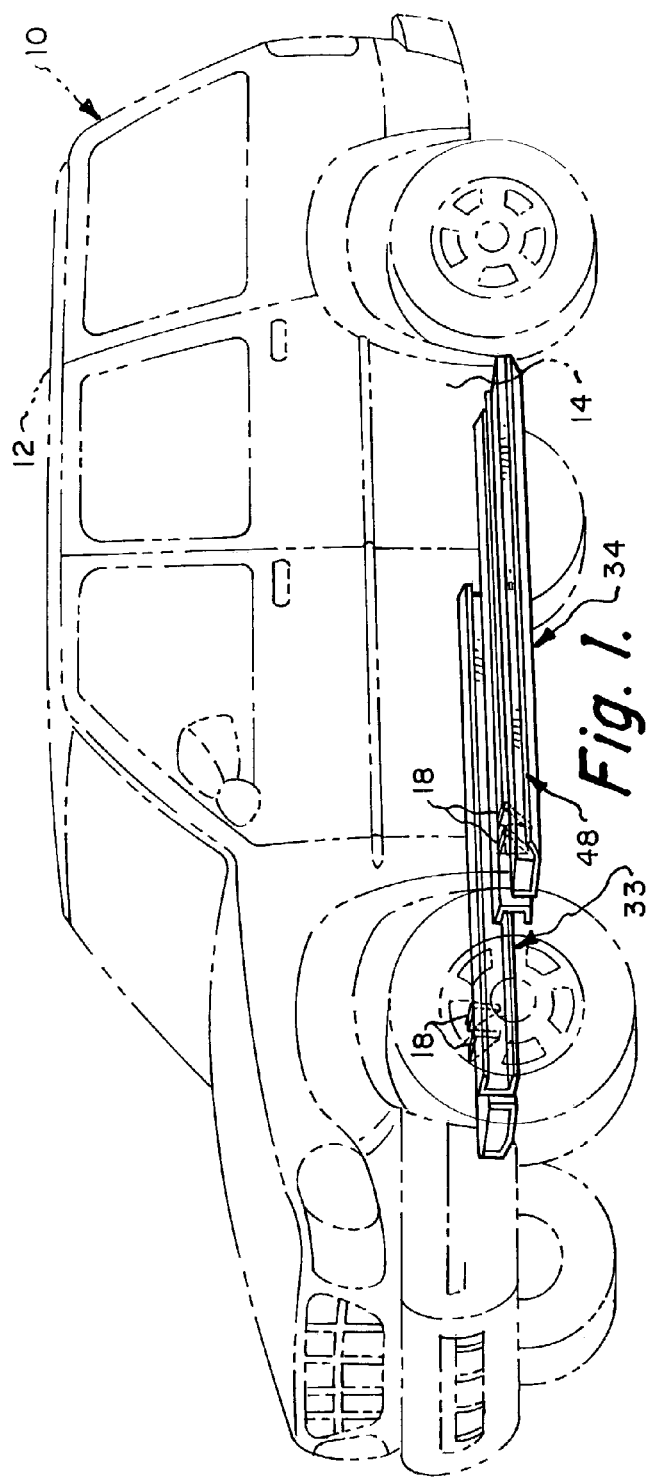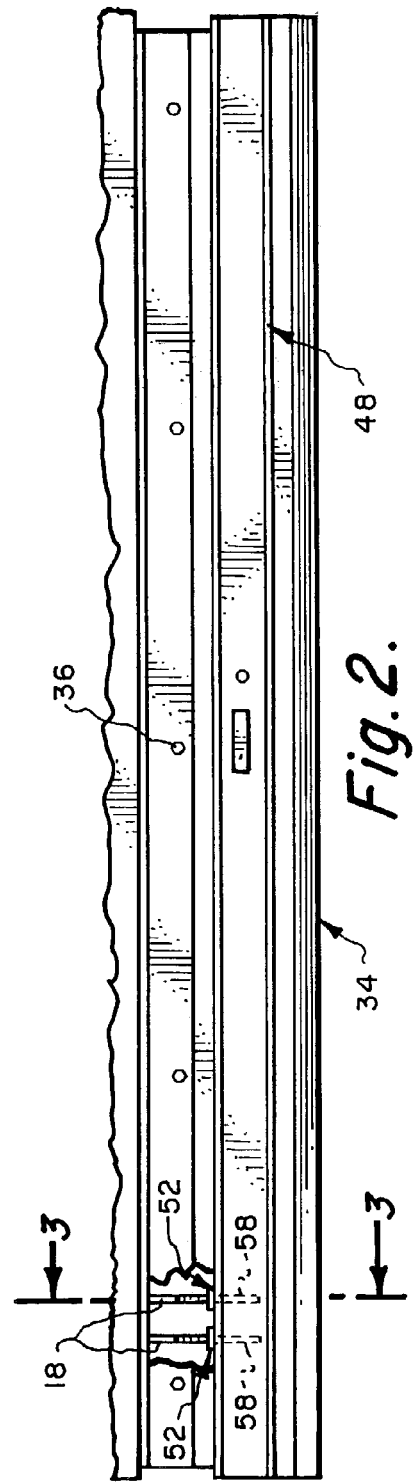

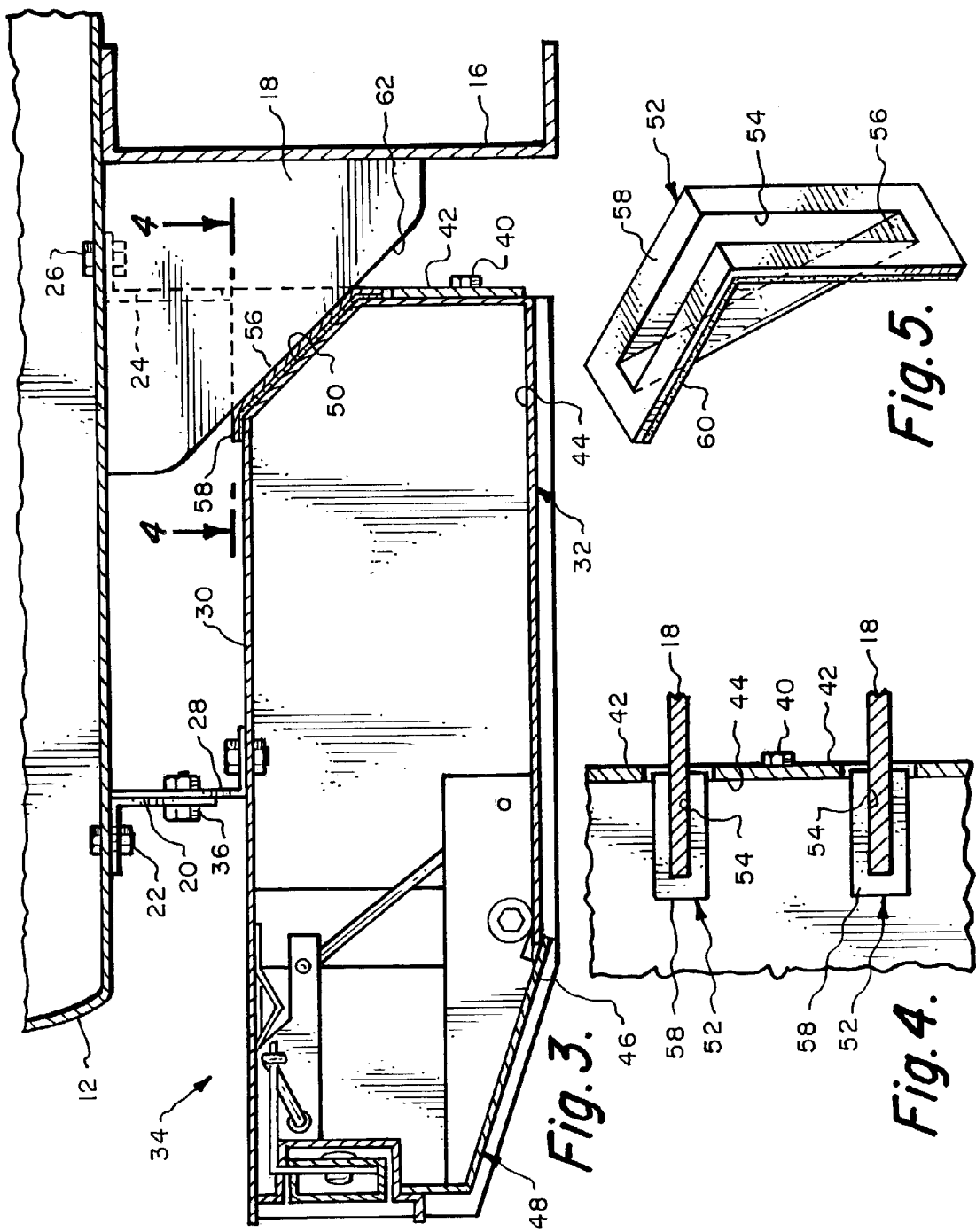

RUNNING BOARD STORAGE BOX WITH GUSSET ATTACHMENT

This application is a continuation-in-part of U.S. patent application Ser. No. 10/081,586, filed Feb. 25, 2002, now abandoned by the same title and same inventor.

BACKGROUND OF THE INVENTION

1. Field of the Invention

The field of this invention relates to storage boxes and more particularly to a storage box that is designed to be mounted as a running board on a land vehicle.

2. Description of the Related Art

Personal land vehicles can be characterized as automobiles, pickup trucks, sport utility vehicles and recreational vehicles. Automobiles, at the present time, do not normally include a running board. A running board, however, is commonly included in conjunction with pickup trucks, sport utility vehicles and recreational vehicles. A running board generally constitutes no more than a step that is located just below the access door(s) on each side of the land vehicle which can be utilized by a human when entering and exiting the land vehicle. The running board is to provide for an immediate location for a user's feet prior to entering the land vehicle after stepping off the ground and when exiting the vehicle prior to stepping on the ground.

Most pickup trucks, sport utility vehicles and recreational vehicles are raised some distance off the ground. Therefore, for a human to enter or exit such a land vehicle requires an initial step of a distance of approximately eighteen inches. This is a significant large step for most people, and it is for this reason that most people prefer to use running boards to break up that eighteen inch distance to be no greater than about twelve inches.

In connection with pickup trucks, sport utility vehicles and recreational vehicles, it is desirable to include as much storage space as possible. Storage space is always desirable for the storing of tools in connection with one's job, or elongated members such is commonly used in conjunction with certain sports, such as skis for skiing. Normally, a running board is designed to be constructed of metal, fiberglass or plastic and function as only a step. However, in the past, it has been known to incorporate some type of a storage container in conjunction with a running board thereby obtaining of additional storage space in conjunction with the land vehicle that heretofore was not possible.

Some vehicles are constructed to make it difficult to mount a storage box type of running board in conjunction with the vehicle. The reason that it is difficult is that there are metallic brace members known as gussets that are mounted between the frame and the chassis of the land vehicle underneath the passenger compartment. In order to utilize a storage box and maximize the storage facility within the storage box, the storage box has to be designed to accommodate these gussets. A gusset comprises no more than a thin plate which is welded between the chassis and the frame. Typically, the thickness of the gusset will be no more than a quarter to one-half inch. It is the protrusion of that gusset in an outward direction that reduces the depth of a storage box in conjunction with a land vehicle. While gussets are commonly encountered, other structures may also be encountered with the storage box designed to accommodate these structures. The term gusset is intended to include these structures.

SUMMARY OF THE INVENTION

The basic embodiment of the present invention comprises a running board storage box designed to be mounted on a vehicle where the storage box has a housing which has an internal chamber which is designed to receive articles to be stowed. The housing has a front edge and a back where the back is spaced opposite the front edge. A door assembly is mounted on the front edge with the purpose of the door assembly to provide access into the internal chamber and also to close off the internal chamber when access is not required. The back is to include gusset accommodation structure that is designed to accommodate a gusset mounted on the vehicle.

A further embodiment of the present invention is where the first basic embodiment is modified by defining the gusset accommodation structure as a first slot formed within the housing.

A further embodiment of the present invention is where the just previous embodiment is modified by the first slot to include an L-shaped attachment to be mounted within the slot. The attachment has a second slot with the gusset to lie within the second slot.

A further embodiment of the present invention is where the just previous embodiment is modified by the second slot having a closed bottom which is angularly disposed relative to the back of the housing.

A further embodiment of the present invention is where a previous embodiment is modified by the attachment having a flange which surrounds the second slot with the flange to abut against the housing.

A further embodiment of the present invention is where the just previous embodiment is modified by the flange incorporating a resilient seal located between the flange and the housing in order to provide a water tight connection between the attachment and the housing.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an isometric view of a pair of running board storage boxes of the present invention being mounted in conjunction with a typical land vehicle being shown in phantom;

FIG. 2 is a front view of a single running board storage box of this invention showing the running board storage box in the closed position where the running board storage box can be used as a step when entering and exiting the land vehicle;

FIG. 3 is a transverse cross-sectional view of the running board storage box of the present invention taken along line 3—3 of FIG. 2;

FIG. 4 is a cross-sectional view taken along line 4—4 of FIG. 3; and

FIG. 5 is an isometric view of the gusset attachment for the running board storage box of the present invention.

DETAILED DESCRIPTION OF THE INVENTION

Referring particularly to the drawings, there is shown in phantom lines a typical land vehicle 10. The land vehicle 10 has an enclosing body or chassis 12. Normally, the chassis 12 will be constructed of sheet material, generally metal.

Included within the chassis 12 are a plurality of access doors 14. The chassis 12 is mounted on a supporting frame 16. It is common that there is included between the chassis 12 and the frame 16 a plurality of strengthening brackets, known as gussets 18. Typically, there are a pair of gussets located in a spaced apart manner with a typical pair arrangement being shown in FIG. 4.

Mounted on the chassis 12 are a plurality of front mounting brackets 20. The front mounting brackets 20 are fixedly mounted by bolt fasteners 22 to the chassis 12. The location of the brackets 20 is near the access doors 14. Also mounted on the chassis 12 are a plurality of rear mounting brackets 24. Again, there will be a plurality of the rear mounting brackets 24 with these brackets 24 also being fixedly mounted on the chassis 12 by means of bolt fasteners 26.

An L-shaped bracket 28 is fixedly mounted to the top 30 of a housing 32 of a storage box 34. A single L-shaped bracket 28 is fixedly mounted to a single front mounting bracket 20 by means of a bolt fastener 36. In referring specifically to FIG. 2, it can be seen that there are five in number of the bolt fasteners 36 for the single storage box 34. The storage box 34 shown in FIG. 2 is the storage box that is located on the left side of the land vehicle 10. It is to be understood that there is a similar storage box 36 located on the right side of the land vehicle 10 with the storage box 36 being reversely positioned relative to storage box 34.

The rear mounting brackets 24 are to be each fixedly mounted by a bolt fastener 40 to the back 42 of the housing 32. The housing 32 includes an internal chamber 44. It is within internal chamber 44 that articles (not shown) are to be stored. The front edge or side 46 of the housing 32 is to have mounted thereon a door assembly 48. The door assembly 48 is to be pivotally movable between and open position and a closed position with the closed position being shown in FIG. 3. The door assembly 48 is for the purpose of providing access into the internal chamber 44 and also for enclosing the internal chamber 44 when such is desired. The door assembly forms no specific part of this invention other than it being a part of the storage box 38 and for that reason the door assembly 48 is not discussed in detail.

The back 42 and top 30 includes a pair of first slots 50 with the first slots 50 being located in a spacing equal to the spacing between a pair of gussets 18. The slots 50 are found within both the top 30 and back 42 at the junction of the connection of the back 42 with the top 30. Normally, in conjunction with certain types of land vehicles 10, there may be two or three gussets 18 on each side of the vehicle 10. An L-shaped attachment 52 is to be mounted in conjunction with each first slot 50. The L-shaped attachments 52 are identical and each include a second slot 54 which has an angled bottom 56. The angled bottom 56 will normally assume a forty-five degree angle relative to the top 30 and also to the back 42. The L-shaped attachment 52 is completely enclosed and is formed as a single piece. Completely surrounding the second slot 54 is a flange 58. The flange 58 is mounted on both legs of the L-shaped attachment 52. Located against the under side of the flange 58 is a resilient seal 60. The L-shaped attachment 52 is to be mounted within a first slot 50 and will function to close off first slot 50 not to permit the entry of any foreign material or water into the internal chamber 44 through the first slot 50. At the same time, the forward edge 62 of a gusset 18 is to be located within a second slot 54 and abut against the angled bottom 56. The forward edge 62 may be slightly spaced from the angled bottom 56. The resilient seal 60 forms a snug contactual relationship with both the top 30, and the back 42 forming a water tight and dust tight seal preventing water and dust from entering into the internal chamber 44.

It may be that no separate securing arrangement is necessary for the L-shaped attachments 52 relative to the housing 32 with the attachments 52 being held in position merely by abutting against its respective gusset 18. However, it is also to be within the scope of this invention that some form of securement, such as welding or some other type of fastener arrangement, may be required to secure each of the attachments 52 onto the housing 32.

The housing 32 is basically rectangular in configuration and generally will be several feet in length. The interior chamber 44 will normally be between four to ten inches in height and about ten to sixteen inches deep. The length of the storage box 34 may be as great as six or eight feet.

It is to be understood that the purpose of the attachments 52 is to prevent seepage of any rain water or any other type of water into the internal chamber 44. Internal chamber 44 can be used to store articles such as fishing equipment, first aid kits, jumper cables, motor fluids, snow chains, emergency tools, water containers or numerous other types of articles. For hunters and military personnel, guns and ammunition could be stored within the internal chamber 44. The potential use of the internal chamber 44 is to keep the articles safe and dry but also to keep valuables out of view.

For some installations the gusset 18 may be squared and not triangularly shaped. In such an instance, the bottom 56 will not be angled but would comprise an L-shaped slot 54. Also, it is considered to be within the scope of this invention to use an attachment 52 for a wider gusset such as a four to six inch wide protrusion. In such an instance, the slot 54 would have to be four to six inches wide.

This invention may be changed to also accommodate body bushings, brake cable holders, leaf spring holders, leaf springs, filters, body bolts or transmission support brackets. There can be any one of a number of structures that would normally limit the size of the storage box but by using this invention, the maximum internal size of storage box can be obtained. The term gusset is to mean any interfering structure and is to include all of the above referenced structures.

What is claimed is:

1. A running board storage box designed to be mounted on a vehicle comprising:
    said storage box having a polygonal shaped housing which has an internal chamber designed to receive articles to be stored, said polygonal shaped housing having a front side and a back where said back is spaced opposite said front side with there being a top interconnecting said front side and said back;
    a door assembly mounted on said housing at said front side, said door assembly to provide access into said internal chamber; and
    said back and said top having means designed to accommodate a gusset mounted on said vehicle.

2. A running board storage box designed to be mounted on a vehicle comprising:
    said storage box having a housing which has an internal chamber designed to receive articles to be stored, said housing having a front edge and a back where said back is spaced opposite said front edge;
    a door assembly mounted on said housing at said front edge, said door assembly to provide access into said internal chamber; and
    said back having means designed to accommodate a gusset mounted on said vehicle; and
    said means comprising a first slot formed within said back, said gusset to lie within said first slot.

3. The running board storage box as defined in claim 2 wherein:
    an L-shaped attachment is to be mounted within said first slot, said L-shaped attachment having a second slot, said gusset to lie within said second slot.

4. The running board storage box as defined in claim 3 wherein:
    said second slot having a closed bottom which is angularly disposed relative to said back.

5. The running board storage box as defined in claim 3 wherein:
    said attachment having a flange which surrounds said second slot, said flange to abut against said housing.

6. The running board storage box as defined in claim 5 wherein:
    a resilient seal located between said flange and said housing, whereby said resilient seal functions to create a watertight seal between said attachment and said housing.

* * * * *